June 18, 1929.  T. A. WILLARD  1,717,863
STORAGE BATTERY
Filed April 10, 1922   2 Sheets-Sheet 1

Inventor
Theodore A. Willard
by
Thurston Kwis & Hudson
Attys

June 18, 1929.   T. A. WILLARD   1,717,863
STORAGE BATTERY
Filed April 10, 1922   2 Sheets-Sheet 2
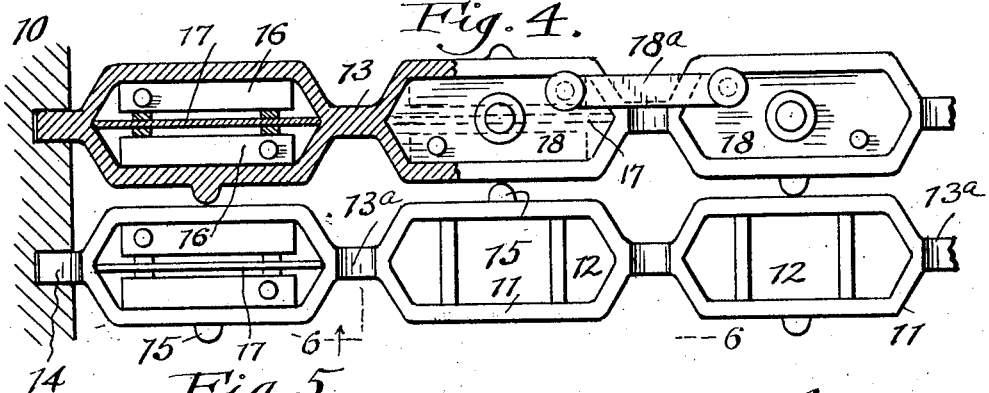
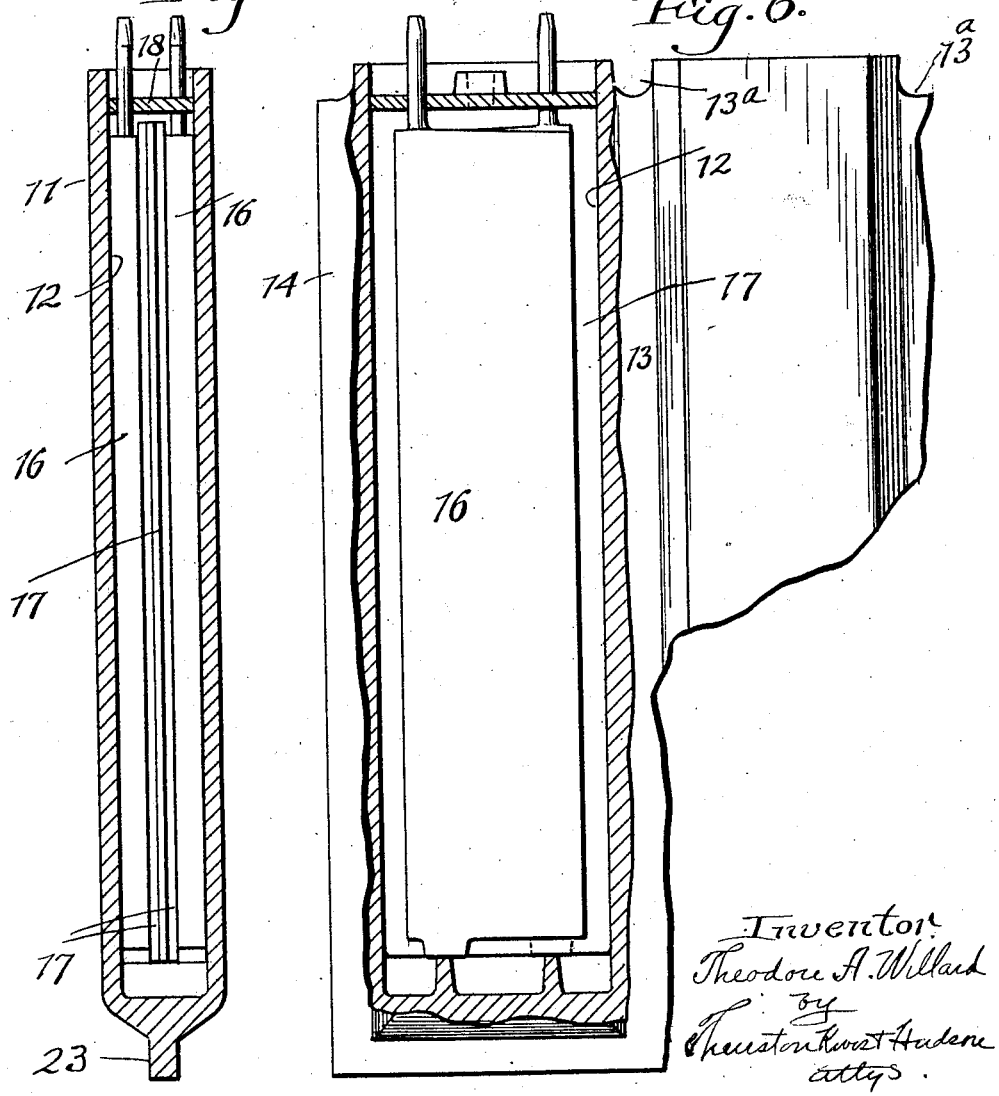

Patented June 18, 1929.

1,717,863

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

STORAGE BATTERY.

Application filed April 10, 1922. Serial No. 551,013.

This invention relates to certain improvements in storage batteries and has for its chief object to provide a battery of high voltage and composed of a large number of small cells, which is compact, and in which leakage of current between cells and between the outside terminals of the battery is minimized.

In producing high voltage batteries for certain uses, and particularly of small ampere hour capacity, leakage of current is an important factor and must be stopped or reduced to an immaterial amount.

In large batteries where compactness is not essential and the spacing between cells can be made anything desired, the prevention of leakage does not present a problem difficult to solve, but in a small, compact, high voltage battery of a large number of cells necessarily very closely arranged, the leakage prevention so essential to the life of the battery and to the efficiency of the battery and of the apparatus with which it is used, has been extremely difficult to attain.

By my invention hereinafter described, though the battery contains a large number of closely arranged cells, the desired result in the way of leakage prevention is attained very successfully.

Figure 1:
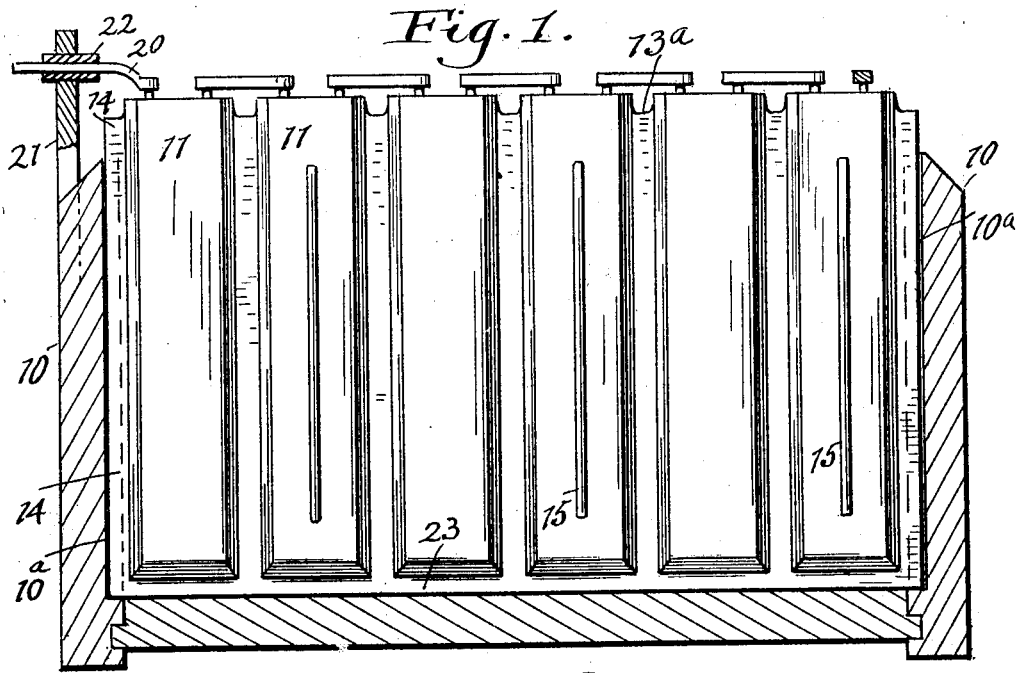
Figure 2:
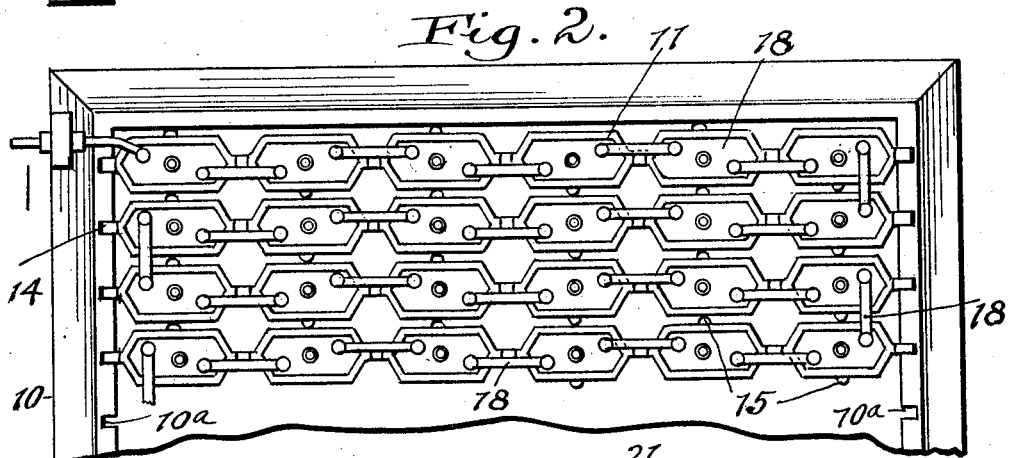
Figure 3:
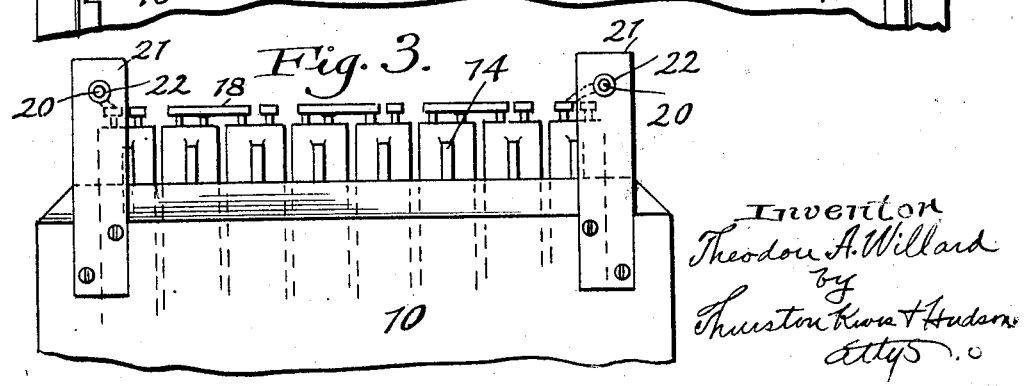

The invention may be briefly summarized as consisting in certain novel details of construction, and in combinations and arrangements of parts which will be described in the specification and set forth in the appended claims.
In the accompanying sheets of drawings wherein I have shown the preferred embodiment, Fig. 1 is a vertical sectional view of the storage battery involving my invention; Fig. 2 is a partial top plan view of the same; Fig. 3 is an end view of the battery; Fig. 4 is an enlarged detail view partly in section and partly in plan, showing portions of two adjacent multi-compartment containers; Fig. 5 is a vertical sectional view taken transversely through a compartment of one of the containers; and Fig. 6 is a sectional view through one compartment of a container, the section being taken at right angles to the section of Fig. 5.
The battery as a whole includes a case 10 of insulating material which may be in the form of a box or crate. The case can be formed advantageously of wood, or other insulating materials may be employed.

The battery here shown is in this instance a high voltage battery of low ampere hour capacity, and as this particular battery has been designed especially for radio work, the case and battery as a whole is desirably of small size, necessitating the use of a large number of closely arranged cells, though the number of cells can be varied as desired. In this instance I have shown a battery containing forty-eight cells. It will be observed that the cells are in multiple unit form or are made up of a number of multi-cell units, there being in this instance eight units each containing six cells though the number of cells per unit can be varied as desired.

Each unit comprises a multi-compartment container 11 of novel shape. This container is formed of hard rubber or other suitable insulating material, but preferably rubber. The container is flat and relatively narrow, and contains six vertical compartments 12 arranged end to end and separated by a relatively narrow web or septum 13. At the ends of the outermost compartments, that is to say, at the ends of the multi-compartment unit I have provided vertical ribs 14, which extend down into vertical guide slots at the ends of the case 10, the slotted ends of the case being designated $10^a$. In the event the case is formed of wood, the slotted ends $10^a$ may be formed of hard rubber to avoid the use at this point of material which may become acid soaked. Preferably the units project up above the sides of the case an inch or more to avoid leakage from cell to cell through the case or along the top thereof.

It is to be noted at this point that the webs or septa between the cells are notched down from the top as shown at $13^a$.

I prefer to provide on the upright outside walls of the multi-compartment container or unit, vertical ribs 15 which will insure the proper spacing of each unit from the adjacent unit or units. These ribs extend from the bottom of the compartment up toward, but terminate some distance from the top so that leakage from one cell to another across the ribs cannot take place. Preferably the ribs are placed part on one side of the unit and part on the other, and those on one side are on different compartments from those on the other side.

The shape of each compartment of the multi-compartment container is an important feature of the invention. It will be noted that in this instance each compartment in cross section is in the form of an elongated hexagon. It is not essential that the compartment have the hexagonal shape, although this particular shape is desired. The most important characteristic, as I now view the matter, is the wedge-shaped or pointed upright end walls of the compartment, that is to say, the width of the compartment measured lengthwise of the unit or container is of greater dimension at the center plane than at the sides thereof. This construction is provided for the reason that I prefer to provide in each compartment one pair of plates 16, one positive and the other negative, and between the plates a separator 17. By reference to Fig. 4 it will be observed that the separator is located at the center of the compartment in the plane of its greatest width, and that the plates 16 are narrower than the separator and lie between the latter and the parallel sides of the compartment. This construction definitely positions both the separator and the plates, and insures that the separator projects beyond the upright marginal edges of the plates, thus reducing to a minimum the liability of leakage from plate to plate around the separator.

The positive and negative plates 16 and the separator 17 are designed to rest on transverse upstanding ribs provided at the bottom of the compartment in much the same manner as in batteries generally, but in this instance the bottom of each plate 16 is provided with one foot or lug designed to rest on one of the supporting ribs of the compartment so that the separator which is not provided with these feet or lugs will project down beneath the plates.

Each cell is provided with a cover 18 through which the terminals of the cell extend, and each cover which is preferably set down somewhat below the top of the cell is provided with a short upstanding vent tube through which electrolyte may be supplied to the cell. The different cells are connected together in series by connectors 18ª which may be lead-burned or otherwise connected to the terminals or posts of the different cells.

One other feature of importance yet remains to be explained, and that is the manner of supporting and insulating the two outside terminals 20 of the battery. It will be observed that the two terminals 20 are in this instance brought out from one end of the battery adjacent opposite corners thereof, and that they extend through and are supported by vertical risers 21 of insulating material such as hard rubber, bakelite, or the like. Each terminal is preferably surrounded by a pure rubber tube 22 which stops creepage of acid, and the rubber tube is tightly fitted into a transverse hole near the top of the riser. Thus each terminal is held securely in position and is separated from the body of the case so that there can be no leakage across the high voltage terminals.

The construction and arrangement above explained has numerous advantages in the way of production, and particularly in the cost of production, and by way of efficiency, and particularly prevention of leakage.

In so far as the multi-compartment container units are concerned, these can be produced inexpensively from two flat sheets of rubber which are pressed together on opposite sides of a plurality of cores shaped to correspond to the desired shape of the compartments, and spaced apart, the two sheets being squeezed together between the cores so as to form the webs or septa 13, and being squeezed together beyond the endmost cores to form the vertical upright guide ribs 14, and also beneath the ends of the cores to form a bottom rib 23 which lies in the plane of and constitutes a continuation of the webs 13 and end guide ribs 14. It will be noted that in thus forming the multi-compartment containers the two sheets of rubber will during vulcanization be thoroughly knitted together, forming one solid piece of rubber.

By arranging the compartments end to end and connecting them together by the relatively narrow webs or septa which are notched down from the top, the possibility of leakage from cell to cell is to all practical purposes entirely eliminated both because of the narrowness of a possible leakage path between cells, and because of the notching which increases the length of the leakage path and makes the connecting portion from the top of one cell to the top of another a poor repository for acid as far as continuity of the path is concerned. Furthermore, when multi-compartment containers are made in the usual manner with the cells side by side and separated by an intervening flat wall of rubber, there exists the possibility of leakage through the cell between two adjacent cells, due to porosity of the material, but when the units are made in this manner with the cells separated by a narrow flat web or septum, it is impossible for leakage to take place through the intervening or connecting wall. Additionally the two terminals of the battery are by the present construction so supported and insulated that leakage from one to the other is to the greatest possible extent guarded against.

Having thus described my invention, I claim:

1. A multi-cell storage battery comprising a plurality of multi-compartment containers arranged side by side, each adapted to contain a number of cells and comprising an integral one piece structure of insulating material formed to provide cell compartments spaced apart and connected by a relatively narrow integral web.

2. In a multi-cell storage battery, a multi-compartment container for a number of cells having the cell compartments arranged end to end and separated by a relatively narrow centrally disposed web, the ends of the cells connected by the web being wedge shaped.

3. In a multi-cell storage battery, a multi-compartment container for a number of cells having the cells separated by relatively narrow integral centrally disposed webs terminating below the upper ends of the cells.

4. In a multi-cell storage battery, a multi-compartment container for a number of cells having the cells arranged end to end and spaced and connected by relatively narrow integral webs terminating below the upper ends of the cells.

5. In a multi-cell storage battery, a casing having guide slots at the end thereof, a multi-compartment container in the form of a body having a number of compartments with relatively narrow integral webs between compartments, and with guide ribs extending up along the outermost compartments adapted to cooperate with the guide slots.

6. In a multi-cell storage battery, a case having guide slots at the ends thereof, a multi-compartment container having its compartments separated by relatively narrow webs, and with ribs extending along the ends of the endmost compartments and along the bottoms of the compartments, said end ribs being adapted to engage in said guide slots.

7. In a multi-cell storage battery, multi-compartment containers, each in the form of a unit having a plurality of cells arranged end to end and separated by relatively narrow webs, and spacing ribs extending vertically along the outer walls of the compartments and terminating below the upper ends of the walls, said ribs being adapted to engage the walls of adjacent containers.

8. In a storage battery, a case having guide slots at the ends thereof, and a plurality of multi-cell units fitted side by side in the case and having guide portions at the ends thereof fitted in said slots.

9. In a storage battery, a case having guide slots at the ends thereof, and a plurality of multi-cell flat units arranged side by side in the case and having at the ends thereof guide ribs fitted into the guide slots of the case.

10. A storage battery comprising a compartment of greater width at the center plane than at the sides thereof and containing a centrally disposed separator extending across the part of greatest width, and plates on opposite sides of the separator of less width than the separator.

11. In a storage battery, a compartment having wedge-shaped or pointed ends, a separator in the compartment and extending across the portion of greatest width, and plates narrower than the separator and located between the latter and the sides of the compartment.

12. In a storage battery, a compartment which in cross section is substantially in the the form of an elongated hexagon, with substantially parallel sides and wedge-shaped ends a separator in the compartment extending between the apices of the ends, and plates on opposite sides of the separator.

13. In a storage battery, a compartment which in cross section is substantially in the form of an elongated hexagon, with substantially parallel sides and wedge-shaped ends, a separator extending centrally across that part of the compartment which is of greatest width, and plates on opposite sides of the separator located between the latter and the sides of the compartment.

14. In a storage battery, a multi-compartment container unit having a series of compartments arranged end to end, and in cross section being substantially in the form of elongated hexagons, and relatively narrow integral webs connecting the compartments.

In testimony whereof, I hereunto affix my signature.

THEODORE A. WILLARD.